United States Patent
He et al.

(10) Patent No.: US 8,055,720 B2
(45) Date of Patent: Nov. 8, 2011

(54) CLUSTER-BASED FRIEND SUGGESTION AGGREGATOR

(75) Inventors: Lin He, New Haven, CT (US); Luke T. Millar, Redmond, WA (US); Jason C Kahn, Atlanta, GA (US)

(73) Assignee: Microsoft Corporation, Redmond, WA (US)

(*) Notice: Subject to any disclaimer, the term of this patent is extended or adjusted under 35 U.S.C. 154(b) by 297 days.

(21) Appl. No.: 12/360,484

(22) Filed: Jan. 27, 2009

(65) Prior Publication Data

US 2010/0191844 A1 Jul. 29, 2010

(51) Int. Cl.
*G06F 15/16* (2006.01)
(52) U.S. Cl. ......... 709/206; 709/207; 715/751; 715/752
(58) Field of Classification Search .............. 709/206, 709/207; 715/751, 752
See application file for complete search history.

(56) References Cited

U.S. PATENT DOCUMENTS

| 7,069,308 | B2 | 6/2006 | Abrams |
| 2004/0210661 | A1 | 10/2004 | Thompson |
| 2007/0287441 | A1 | 12/2007 | Im et al. |
| 2008/0134039 | A1 | 6/2008 | Fischer et al. |
| 2008/0154915 | A1 | 6/2008 | Flake et al. |
| 2008/0299953 | A1* | 12/2008 | Rao ........................... 455/414.1 |
| 2009/0271370 | A1* | 10/2009 | Jagadish et al. ................. 707/3 |
| 2010/0017307 | A1* | 1/2010 | Barbour et al. ................ 705/27 |
| 2010/0199192 | A1* | 8/2010 | Sittig et al. .................... 715/751 |

OTHER PUBLICATIONS

Daniyalzade, et al., "Facebook Friend Suggestion", Retrieved at <<http://www.stanford.edu/class/cs229/proj2007/DaniyalzadeLipus-FacebookFriendSuggestion.pdf>>, pp. 5.
Watts, et al., "Identity and Search in Social Networks", Retrieved at <<http://arxiv.org/PS_cache/cond-mat/pdf/0205/0205383v1.pdf>>, Feb. 1, 2008, pp. 1-4.
Riley, Duncan, "Facebook Now Supports LinkedIn Style Friend Suggestions", Retrieved at <<http://www.techcrunch.com/2008/02/05/facebook-now-supports-linkedin-style-friend-suggestions/>>, Feb. 5, 2008, pp. 5.
Schwartz, et al., "Discovering Shared Interests among People using Graph Analysis of Global Electronic Mail Traffic", Retrieved at <<http://www.codeontheroad.com/papers/Email.Study.Paper.pdf>>, Oct. 1992, pp. 15.
Yahia, et al., "Challenges in Searching Online Communities", Retrieved at <<http://sites.computer.org/debull/A07June/sihem.pdf>>, IEEE 2007, pp. 1-9.
Sinha, Rashmi et al., "Comparing Recommendations Made by Online Systems and Friends", In Proceedings of DELOS-NSF 2001, Available at <http://www.ercim.org/publication/ws-proceedings/DelNoe02/RashmiSinha.pdf>,(2001),6 pages.
Roth, Maayan "Suggesting (More) Friends Using the Implicit Social Graph", retrieved from <http://static.googleusercontent.com/external_content/untrusted_dlcp/research.google.com/en/us/pubs/archive/37120.pdf> on Sep. 16, 2011,(Jul. 2011),11 pages.

* cited by examiner

*Primary Examiner* — Frantz Jean

(57) ABSTRACT

Techniques are described to generate a list of suggested friends for a client of a social networking service. In an implementation, a cluster of clients is identified from among the clients of the social networking service. The cluster of clients includes the client for which the list of suggested friends is to be generated. The list of suggested friends for the client may then be generated and may include one or more clients of the social networking service selected based on connections with the cluster of clients. The list indicates at least one other client of the social networking service that is suggested as a friend.

17 Claims, 6 Drawing Sheets

CLUSTER-BASED FRIEND SUGGESTION AGGREGATOR

BACKGROUND

The growth in popularity of social networking services is ever increasing. Social networking services allow clients to interact with online communities who share interests and/or activities, or who are interested in exploring the interests and activities of other clients. In this manner, social networking services attempt to mirror real-world social relationships.

Clients of social networking services may create a list of friends representing other clients of the service with which the clients desire to interact, e.g., by sending and receiving emails or instant messages, sharing content such as files or photographs, and so forth. However, creating this list using traditional social networking services was often cumbersome and inefficient, which may result in user frustration.

SUMMARY

Techniques are described to generate a list of suggested friends for a client of a social networking service. In an implementation, a cluster of clients is identified from among the clients of the social networking service. The cluster of clients includes the client for which the list of suggested friends is to be generated. The list of suggested friends for the client may then be generated. The list of suggested friends may include one or more of the plurality of clients that are selected based on connections of the clients with the cluster of clients.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Figure 1:
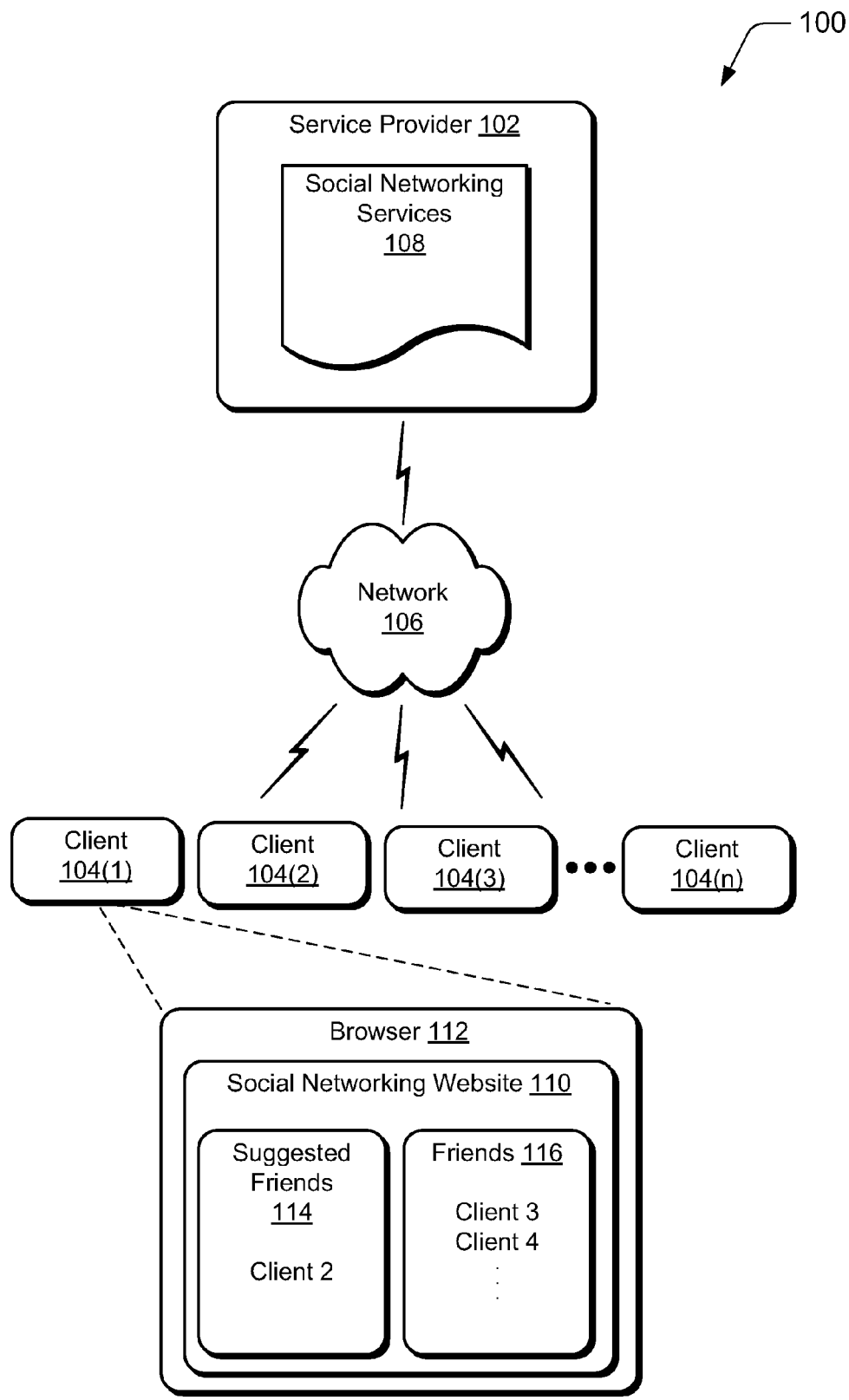
FIG. 1 is an illustration of an environment in an example implementation that is operable to generate a list of suggested friends for a client of a social networking service.

Many social networking services allow clients of the services to create a list of friends representing other clients of the service that commonly interact with the client (e.g., by sending and receiving emails or instant messages, sharing content, and so on). In many embodiments, this list of friends is referred to as a "friends list" and clients within the list are referred to as "friends." Some social networking services further include friend finder features to assist clients of the service in generating a friends list by recreating the client's real-world networks within the service. However, these features can be inaccurate in predicting clients of the social networking service that should be connected to a client as friends (e.g., listed as a friend in the client's friends list). Consequently, the friend suggestions made by the features may be inaccurate thereby causing the suggestions to be rejected by the client.

Clients of a social networking service may be connected in a variety of ways. In implementations, a connection may be created between clients when the clients interact with one another. For example, clients may be connected when the clients are friends (e.g., when one or both of the clients are listed in the friends list of the other client). Clients may also be connected by social interactions within the service such as by sending and receiving emails or instant messages, posting comments to a blog site, and so forth. Other connections are possible.

In one or more implementations, when clients of a social networking service are mapped in a social graph that illustrates connections representing friend relationships between the clients, it may be possible to identify tightly connected groups of clients within the network (e.g., clients who share one or more common friends). However, a client within the group may not share a connection with each of the other clients within the group. Thus, a client within a group of clients may lack a connection to one or more other clients within the group. If identified, these clients have an increased likelihood of resulting in a desirable friend suggestion.

Techniques are described to generate a list of suggested friends for a client of a social networking service. In implementations, a cluster of clients that includes the client for which the list of suggested friends is to be generated is identified from among the clients of the social networking service. For example, the cluster of clients may include clients identified to be in a tightly connected group (e.g., clients identified as being connected within a group because the clients share a sufficient number of friends within other clients in the group). A list of suggested friends for the client may then be generated to identify at least one other client of the social networking service that is suggested as a friend.

In implementations, clients of the social networking service may be suggested as friends based on connections of the clients with clients in the identified cluster of clients. For instance, one or more clients may be ranked based on the connections of the one or more clients with clients in the cluster of clients to create a ranked suggestion list. The list of suggested friends may then be generated. The list may include one or more friend suggestions selected from the clients of the ranked suggestion list. Further discussion of the generation of a list of suggested friends may be found in relation to FIGS. 3. Further discussion of the identification of clusters of clients within the social network may be found in relation of FIGS. 4 and 5.

Friend suggestions may also be made by data providers such as other clients, other services and so forth. For example, clients may be suggested as friends via friend suggestions made by other clients, by the social networking service based on interactions of the client with other clients of the service, by other services (e.g., email services, instant messaging services, content sharing services, etc.) and so on. Friend suggestions made by data providers may be ranked and added to the list of suggested friends.

Friend suggestions may be ranked using a variety of criteria. For instance, data providers that make friend suggestions may be assigned weighting factors that may be used to rank the friend suggestions made by the data provider. In embodiments, the weighting factor assigned to a data provider may be adjusted over time based on past friend suggestions made by the data provider. For example, the weighting factor may be adjusted based on a feedback loop in which the historical ratio of acceptances to rejections of friend suggestions made by the data provider is used to adjust the weighting factor. Further discussion of the use of acceptance/rejection data in a feedback loop to rank the data providers may be found in relation to FIGS. 6.

In the following discussion, an example environment is first described that is operable to perform the techniques to generate a list of suggested friends for a client of a social networking service described herein. Exemplary procedures are then described which may be employed in the exemplary environment, as well as in other environments without departing from the spirit and scope thereof.

Example Environment

FIG. 1 illustrates an environment 100 in an example implementation that is operable to generate a list of suggested friends for a client of a social networking service. The illustrated environment 100 includes a service provider 102 and one or more clients 104(1)-104(n) that communicate via a network 106 (where "n" is an integer representing the total number of clients 104 connected to the network 106 that receive the software services from the service provider 102). In implementations, the service provider 102 may be configured to implement social networking services 108 to the clients 104 to allow the clients 104 to interact with one another.

The service provider 102 may be configured in a variety of ways. For example, the service provider 102 may be configured as a server computer that is capable of communicating over a wired or wireless network. In one implementation, the service provider 102 may be an application service provider (ASP) that provides access to the social networking services 108 to clients 104 via the Internet. The service provider 102 may also relate to a person and/or entity such as a software developer or service operator. Thus, the service provider 102 may describe logical services that include operators (e.g., persons or entities), software and/or devices.

The clients 104 may also be configured in a variety of ways. For example, one or more of the clients 104 may be configured as a computer such as a desktop or laptop computer that is capable of communicating over a wired or wireless network. The clients 104 may also be configured as a mobile connected device such as a personal digital assistant, a smart phone, or a cell phone that is capable of communicating over a wireless network; an entertainment appliance; a set-top box communicatively coupled to a display device; a game console, and so forth. Thus, the clients 104 may range from full resource devices with substantial memory and processor resources (e.g., a personal computer, a game console, etc.) to low-resource devices with limited memory and/or processing resources (e.g., a cell phone, a set top box, etc.). The clients 104 may also relate to a user such as a person and/or entity that operate such devices. Thus, clients 104 may describe logical clients that include users (e.g., persons or entities), software and/or devices.

The network 106 may assume a wide variety of configurations. For example, the network 106 may include the Internet, a wide area network (WAN), a local area network (LAN), a wireless network (e.g., a WIFI (IEEE 802.11) network), a cellular telephone network, a public telephone network, an extranet, an intranet, and so on. Further, although a single network 106 is shown, the network 106 may be configured to include multiple networks. For instance, a desktop or laptop computer may connect to the Internet via a local area network so that the computer's web browser may access a webpage provided by a website within the World Wide Web (WWW). Similarly, a mobile browser in a smart phone may access a webpage within a corporate intranet via a cellular telephone network. A wide variety of other instances are also contemplated.

In example implementations, the clients 104 may access the social networking services 108 via a website hosted by the service provider 102. For example, the social networking services 108 may be accessed via a social networking website 110 accessed by a web browser 112 using Hyper Text Markup Language (HTML), a special purpose client software application provided to the client 104 by the service provider 102, and so forth. The web browser 112 enables the client 104 to display and interact with a webpage such as a webpage within the World Wide Web, a webpage provided by a web server in a private network, and so forth. More specifically, the browser 112 may allow the client 104 to display and interact with one or more webpages of the social networking website 110.

The service provider 102 may generate a list of suggested friends 114 for a first client (e.g., client 104(1)) of the social networking services 108 to identify one or more other clients (e.g., clients 104(2)) of the social networking services 108 that are suggested as possible friends for the client 104(1). In embodiments, the list of suggested friends 114 for the client 104(1) may be displayed as part of the social networking website 110 by the client's browser 112. The client 104(1) may then accept or reject clients suggested as friends (e.g., client 104(2)) within the list of friends 114.

If a client suggested as a friend (e.g., client 104(2)) is accepted as a friend by the client 104(1), that client 104(2) is added to the first client's friends list 116. In this manner, the suggested client 104(2) may be allowed to interact with the client 104(1). If, on the other hand, a client suggested as a friend 104(2) is rejected by the client 104(1), the suggested client 104(2) is not added to the first client's friends list 116. In implementations, the suggested client 104(2) may be prevented from interacting with the client 104(1). Once accepted or rejected by the client 104(1), the suggested client 104(2) may be removed from the suggested friends list 114. In embodiments, the client 104(1) may be permitted to ignore the suggestion (e.g., by not accessing the suggested friends list 114 to accept or reject a suggested client 104(2)).

Figure 2:
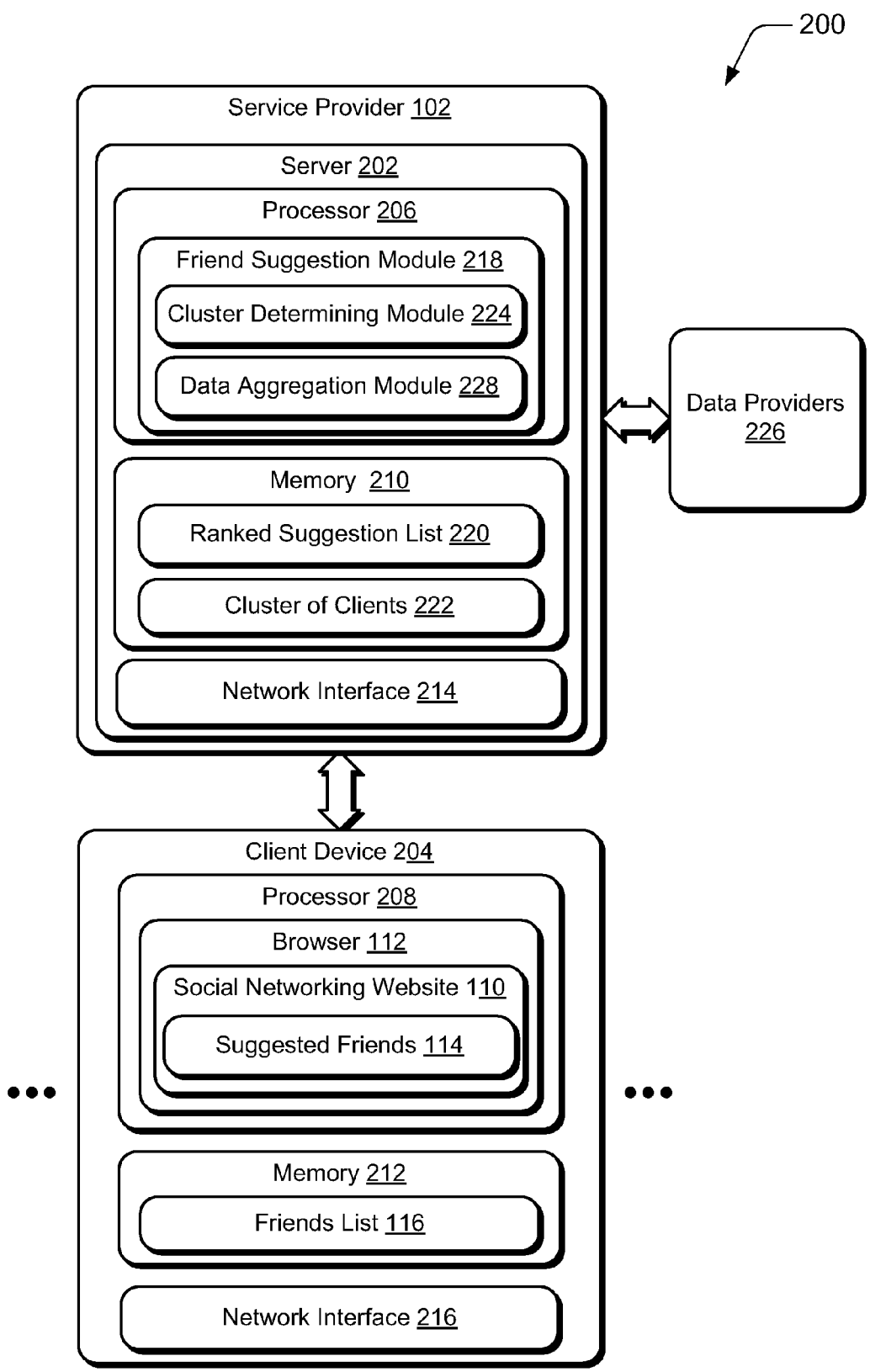
FIG. 2 is an illustration of a system in an example implementation showing a service provider and a client of FIG. 1 in greater detail.

FIG. 2 illustrates a system 200 in an example implementation showing the service provider 102 and a representative one of the clients 104 of FIG. 1 in greater detail. In FIG. 2, the service provider 102 is illustrated as being implemented by a server 202 while the client 104 of FIG. 1 is illustrated as being implemented by a client device 204. The server 202 and the client device 204 are illustrated as including a respective processor 206 or 208; a respective memory 210 or 212; and a respective network interface 214 or 218. In the following discussion, elements of the server 202 are described with reference to FIG. 2. Respective elements and/or reference numbers related of the client device 204 are shown in parentheses. Where appropriate, elements of the client device 204 are described separately.

The processor 206 (208) provides processing functionality for the server 202 (client device 204) and may include any number of processors, micro-controllers, or other processing systems and resident or external memory for storing data and other information accessed or generated by the server 202 (client device 204). The processor 206 (208) may execute one or more software programs which implement techniques described herein. The processor 206 (208) is not limited by the materials from which it is formed or the processing mechanisms employed therein, and as such, may be implemented via semiconductor(s) and/or transistors (e.g., electronic integrated circuits (ICs)), and so forth.

The memory 210 (212) is an example of computer-readable media that provides storage functionality to store various data associated with the operation of the server 202 (client device 204), such as the software program and code segments mentioned above, or other data to instruct the processor 206 (208) and other elements of the server 202 (client device 204) to perform the steps described herein. Although a single memory 210 (212) is shown, a wide variety of types and combinations of memory may be employed. The memory 210 (212) may be integral with the processor 206 (208), stand-alone memory, or a combination of both. The memory may include, for example, removable and non-removable memory elements such as RAM, ROM, Flash (e.g., SD Card, mini-SD card, micro-SD Card), magnetic, optical, USB memory devices, and so forth. In embodiments of the client device 204, the memory 212 may include removable ICC (Integrated Circuit Card) memory such as provided by SIM (Subscriber Identity Module) cards, USIM (Universal Subscriber Identity Module) cards, UICC (Universal Integrated Circuit Cards), and so on. In implementations, the memory 210 of the service provider 102 may include memory to store one or more service-based software applications 108 to be provided to the client device 204.

The network interface 214 (216) provides functionality to enable the server 202 (client device 204) to communicate with one or more networks, such as network 106 of FIG. 1. In various implementations, the network interface 214 (216) may include a variety of components such as modems, routers, wireless access points, cellular telephone transceivers, and so forth, and any associated software employed by these components (e.g., drivers, configuration software, and so on). In FIG. 2, the network interface 214 (216) is illustrated as being an internal component of the server 202 (client device 204). However, in some implementations, one or more components of the network interface 214 (216) may be external components coupled to the server 202 (client device 204) via a wired or wireless connection.

The client device 204 illustrated as including the browser 112, which may be implemented as a software application executed by the processor 208 of the client device 204. The browser 112 may be configured in a variety of ways. For example, the browser 112 may be configured as a web browser suitable for use by a full resource device with substantial memory and processor resources (e.g., a personal computer, a laptop computer, a game console, etc.). In other implementations, the browser 112 may be configured as a mobile browser suitable for use by a low-resource device with limited memory and/or processing resources (e.g., a PDA, a smart phone, a cell phone, etc.). Such mobile browsers typically conserve memory and processor resources, but may offer fewer browser functions than web browsers.

As illustrated in FIG. 2, the server 202 may include a friend suggestion module 218. The friend suggestion module 218 represents functionality to generate a ranked suggestion list 220. The ranked suggestion list 220 identifies one or more other clients of the social networking service that may be suggested as possible friends to the client device 204 by the service provider 102. For example, in embodiments, the clients identified in the ranked suggestion list 220 may be included in the suggested friends list 114 of the social networking website 110 that may be accessed by the client device 204 using the browser 112.

In implementations, the friend suggestion module 218 may generate the ranked suggestion list 220 by ranking clients of the social networking service based on the connections of the clients with clients in a cluster of clients 222 that includes the client device 204, i.e., an associated user of the client device 204. An example process that allows for generating a ranked suggestion list in this manner is described herein in the discussion of FIG. 3.

In the implementation illustrated in FIG. 2, the friend suggestion module 218 may include a cluster determining module 224. The cluster determining module 224 represents functionality to identify the cluster of clients 222 from among the clients 104 of FIG. 1 of the social networking service. For example, the cluster 222 may include clients identified to be in a tightly connected group (e.g., clients identified as being connected within a group because the clients share a sufficient number of friends within other clients in the group).

The friend suggestion module 218 may also receive friend suggestions made by data providers 226 such as other clients, other network services and so forth. For instance, manual friend suggestions may be made by other clients of the social networking service. Thus, a client may suggest another client as a friend to the client device 204. Automated friend suggestions may be made by the social networking service or other network services with which the client device 204 interacts. For example, the social networking service may suggest a client as a friend to the client device 204 based on interactions of the client device 204 with other clients of the social networking service. Similarly, a network service such as an email service, an instant messaging service, a content sharing service, and so on, may suggest a a client as a friend to the client device 204 based on interactions of the client device 204 with the network service.

The friend suggestion module 218 may rank friend suggestions made by the data providers 226 and add them to the ranked suggestion list 220. Thus, the ranked suggestion list 220 may include either or both of friend suggestions made by the friend suggestion module 218 based on connections of clients of the social networking service with the cluster of clients 222 and friend suggestions made by one or more of the data providers 226. Friend suggestions may be ranked using a variety of criteria. In implementations, the friend suggestion module 218 may weight friend suggestions by applying one or more weighting factors.

The friend suggestion module may further include functionality to filter friend suggestions to prevent the client device 204 from receiving friend suggestions from undesirable sources. Thus, in some instances the friend suggestion module 218 may not add friend suggestions made by one or more of the data providers 226 to the ranked suggestion list 220. For example, a threshold ranking may be established and used by the friend suggestion module 218 to determine if a friend suggestion is to be included in the ranked suggestion list 220. If the friend suggestion module 218 ranks the friend suggestion below the threshold ranking, the friend suggestion is not added to the ranked suggestion list 220.

In the implementation illustrated in FIG. 2, the friend suggestion module 218 may include a data aggregation module 228. The data aggregation module 228 represents functionality to augment the ranked suggestion list 220 by applying aggregate client interaction data received from the one or more data providers 226. In implementations, the data aggregation module 228 may receive a variety of data from various data providers 228. The aggregate client interaction data may include friend suggestions made by the data providers 226. The aggregate client interaction data may also include information used to generate weighting factors for the data providers, and so forth. In implementations, aggregate client interaction data may further describe interactions of the client device 204 with other clients of the social networking service. For example, data may be generated by data providers 228 describing interaction with the client device 204, such as the sharing of a photograph with another client of the social networking service, the posting of comments in a blog site visited by another client of the social networking service, and so forth.

The data aggregation module 228 may further include functionality to generate weighting factors for use by the friend suggestion module 218 in ranking friend suggestions made by the data providers 226. Weighting factors may also be received from the data providers 226. In some embodiments, the weighting factors applied by the friend suggestion module 218 may be adjusted. Further discussion of the use of weighting factors to rank friend suggestions and the use of acceptance/rejection data in a feedback loop to adjust weighting factors assigned to the data providers 226 may be found in relation to FIG. 6.

Friend suggestions may be stored in a variety of ways. For instance, in one embodiment, friend suggestions may be stored in memory 210 as a list in a hidden private message for the client device 204. Each friend suggestion stored in the list may include a client identification to identify the client device 204 to receive the friend suggestion, a source identification to identify the data provider 226 that made the friend suggestion and a source count that identifies the number of times the data provider 226 has made the friend suggestion.

As discussed in relation to FIG. 1, if a client suggested as a friend by the suggested friend list 114 is accepted as a friend, that client may be added to the friends list 116. Conversely, if a client suggested as a friend is rejected, the suggested client is not added to the friends list 116. In FIG. 2, the friends list 116 is illustrated as being stored in memory 212 of the client device 204. However, it is contemplated that the friends list 116 may be stored in memory 210 of the service provider 202 and accessed by the client device 204 via the social networking website 110 using the browser 112. Further discussion of the creation of the ranked suggestion list may be found in relation to the following procedures.

Generally, any of the functions described herein can be implemented using software, firmware, hardware (e.g., fixed logic circuitry), manual processing, or a combination of these implementations. The terms "module" and "functionality" as used herein generally represent software, firmware, hardware or a combination thereof. In the case of a software implementation, for instance, the module represents executable instructions that perform specified tasks when executed on a processor, such as the processors 206 of the server 202 of FIG. 2. The program code can be stored in one or more computer readable media, an example of which is the memory 208 of the server 202 of FIG. 2. The features of the techniques to stream information describing a webpage described below are platform-independent, meaning that the techniques may be implemented on a variety of commercial computing platforms having a variety of processors.

Example Procedures

The following discussion describes techniques to generate a list of suggested friends for a client of a social networking service. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the environment 100 of FIG. 1 and the system 200 of FIG. 2.

Figure 3:
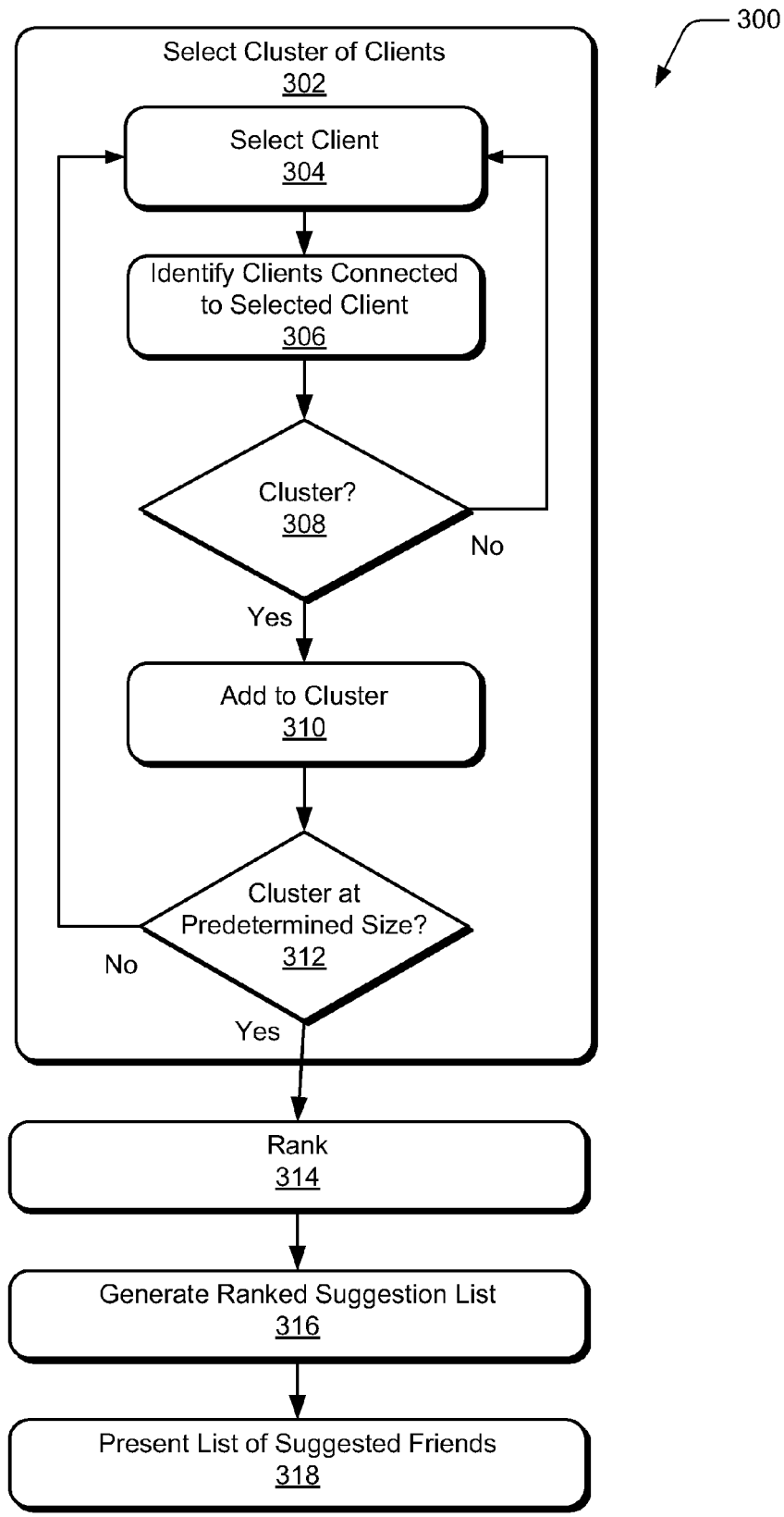
FIG. 3 is a flow diagram depicting a procedure in an example implementation in which a list of suggested friends for a client of a social networking service is generated based on a cluster of clients identified from the social networking service.

FIG. 3 is a flow diagram depicting a procedure 300 in an example implementation in which a list of suggested friends is generated and presented to a client of a social networking service. As illustrated, a cluster of clients is first selected from among the clients of the social networking service (block 302). The cluster of clients includes a first client for which the list of suggested friends is to be presented and other clients of the social networking service that are related to the first client through one or more degrees of separation. In embodiments, the cluster of clients may include clients identified to be in a tightly connected group that contains the first client.

In example implementations, clients may be selected to be in the cluster because the clients are identified as being connected because the clients share a sufficient number of friends with other clients. For instance, as shown in FIG. 3, the cluster may be identified by first selecting a client from among the clients of the social networking service (block 304).

The clients of the social networking service that are connected to the selected client are then identified (block 306). For example, clients that are friends of the selected client may be identified from the selected client's friends list, based on interactions of the selected client with other clients, and so forth.

Next, a determination is made whether the selected client is connected to the cluster of clients (decision block 308). If the selected client has no connections or if a determination is made that the selected client has insufficient connections with the cluster ("no" from decision block 308), another client is selected (block 304) and the procedure 300 is repeated for the newly selected client. However, if the selected client has sufficient connections to the cluster ("yes" from decision block 308), the selected client is added to the cluster 310.

For example, a client may be determined to have sufficient contacts with the cluster if the client has a predetermined number of friends that are members of the cluster already. Thus, a determination may be made as to whether the selected client has one or more friends that are members of the cluster. If a sufficient number of friends of the selected client are members of the cluster, the client may be added to the cluster. However, if the selected client has no friends (e.g., the selected client's friends list is empty) or an insufficient number of the selected client's friends are members of the cluster, the client is not added to the cluster.

A determination is then made whether the cluster has reached a predetermined number of clients (decision block 312). If the cluster has not reached the predetermined number of clients ("no" from decision block 312), another client is selected (block 304) and the process 300 is repeated. However, if the cluster is determined to have reached the predetermined number of clients ("yes" from decision block 312), additional clients are not added to the cluster and the procedure continues to block 314 as further described below. In embodiments, the number of clients in the cluster of clients may be adjusted by the service provider furnishing the social networking service or by the client (e.g., service provider 102 or client 104(1) of FIG. 1). For example, the size of the cluster may be adjusted to increase or decrease the number of friends that may be suggested to the client, to improve the quality of the suggestion (e.g., to improve the likelihood that the friends suggested will be accepted by the client), and so forth.

Once the cluster of clients is identified (block 302), one or more clients of the social networking service may then be ranked based on the connections of the clients to the cluster of clients (block 314). For instance, in one embodiment, clients of the social networking service that have one or more friends in the cluster of clients may be ranked based on the number of friends the clients share with the cluster, the first client, and so forth. Ranking of the clients may be used to determine whether the client or clients being ranked are to be suggested as a friend to the first client, the order of suggestion of the clients being ranked in the list of suggested friends, and so forth.

A ranked suggestion list is then generated from the ranking of clients (block 316). In embodiments, the ranked suggestion list contains identifiers (e.g., usernames, screen names, and so forth) and may include descriptive information describing each client identified as a client to be suggested as a friend, arranged in the order of ranking. In embodiments, the ranked suggestion list may further include information to allow the first client to interact with the suggested clients (e.g., email address, instant messaging address, and so forth). A list of suggested friends may then be generated based on the ranked suggestion list and presented to the client (block 318).

Figure 4:
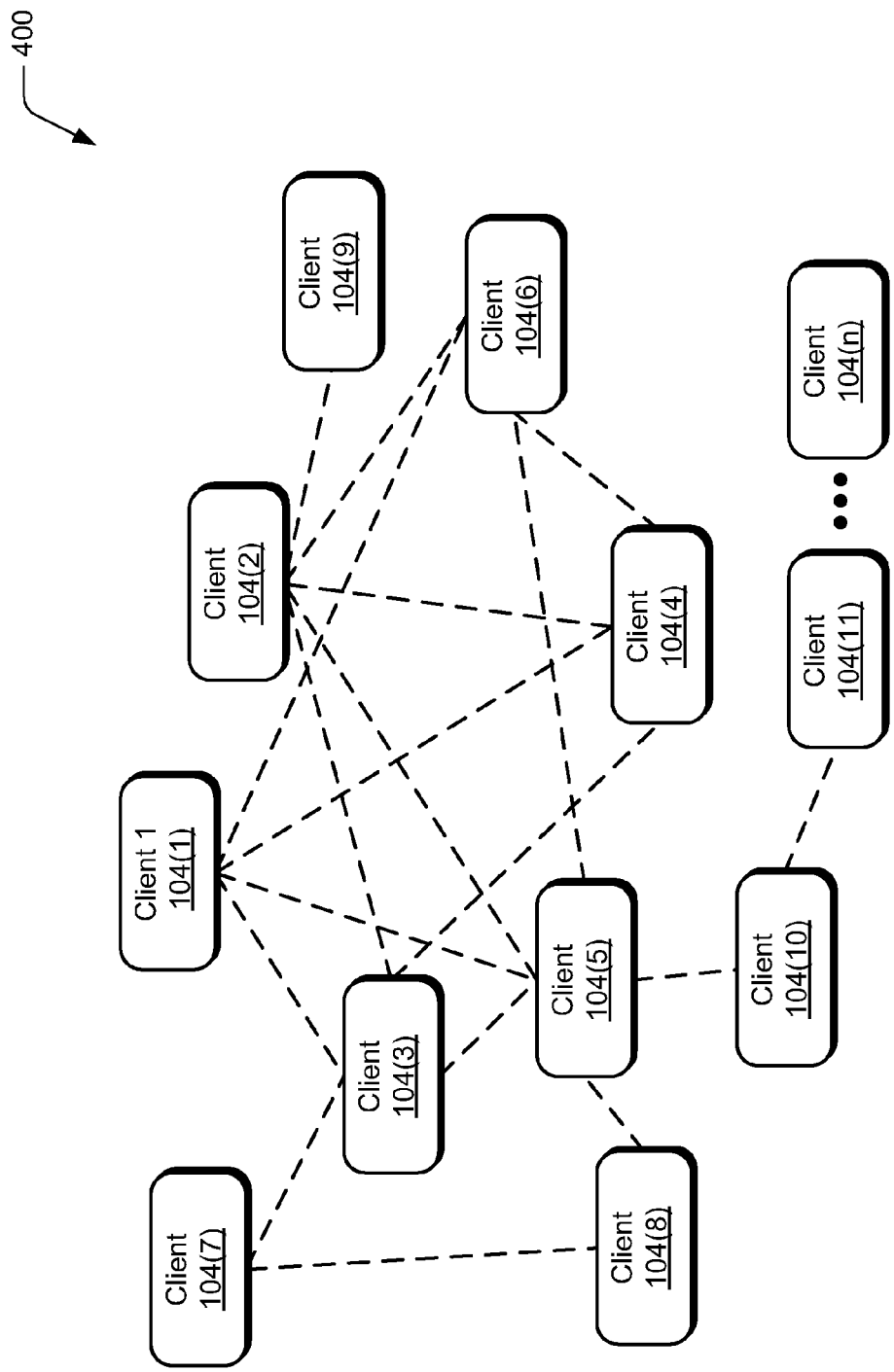
FIG. 4 is an illustration depicting a client graph illustrating the interconnections of clients in a portion of an example social networking service.

An example implementation of the process 300 of FIG. 3 to identify a list of suggested friends for a client of a social networking service is now described with reference to FIGS. 4 and 5. FIG. 4 illustrates an example social networking service 400. As shown in FIG. 4, the social networking service 400 may be utilized by one or more clients 104(1)-104(n) to interact with one another as described in relation to FIG. 1. Connections between clients 104(1)-104(n) are illustrated by dashed lines in FIG. 4. Thus, any two clients connected by a dashed line may be connected as friends within the service 400 (e.g., one or both of the clients may have the other listed as a friend in that client's friends list).

A cluster of clients may be selected from among the clients 104(1)-104(n) of the social networking service 400. The cluster of clients includes the client for which the suggestion of friends is to be made (e.g., client 104(1)) and other clients of the social networking service 400 that are related to the client 104(1) through one or more degrees of separation.

In implementations, the cluster of clients may initially contain the client 104(1). A client (e.g., client 104(3)) that is a friend of the client 104(1) (e.g., listed in the first client's friends list) may be selected at random. Since the selected client 104(3) is listed in the friends list of the client 104(1), the selected client 104(3) may be added to the cluster. Thus, friends of the client 104(1) (e.g., clients 104(3)-104(6)) may be added to the cluster. Thereafter, these clients 104(3)-104(6) may be utilized to identify other clients (e.g., clients 104(2), 104(7) 104(n)) that may be members of the cluster of clients but that are not themselves friends of the client 104(1) and are thus an additional degree of separation from the client 104(1).

For example, additional clients (e.g., clients 104(2), 104(7), 104(8), 104(9) and 104(10)) that are friends of the clients 104(3)-104(6), but that are not themselves friends of the client 104(1) may be identified (e.g., from the friends lists of the clients 104(3)-104(6)). These clients may then be selected to determine if they have sufficient connections to the cluster of clients (e.g., a sufficient number of friend that are members of the cluster) and should be added to the cluster. This process may be repeated for clients (e.g., clients 104(11)-104(n)) that are further degrees of separation from the client 104(1) until the cluster of clients has reached a predetermined size (e.g., a predetermined number of clients), or until each of the clients 104(1)-104(n) of the social networking service 400 has been considered.

Figure 5:
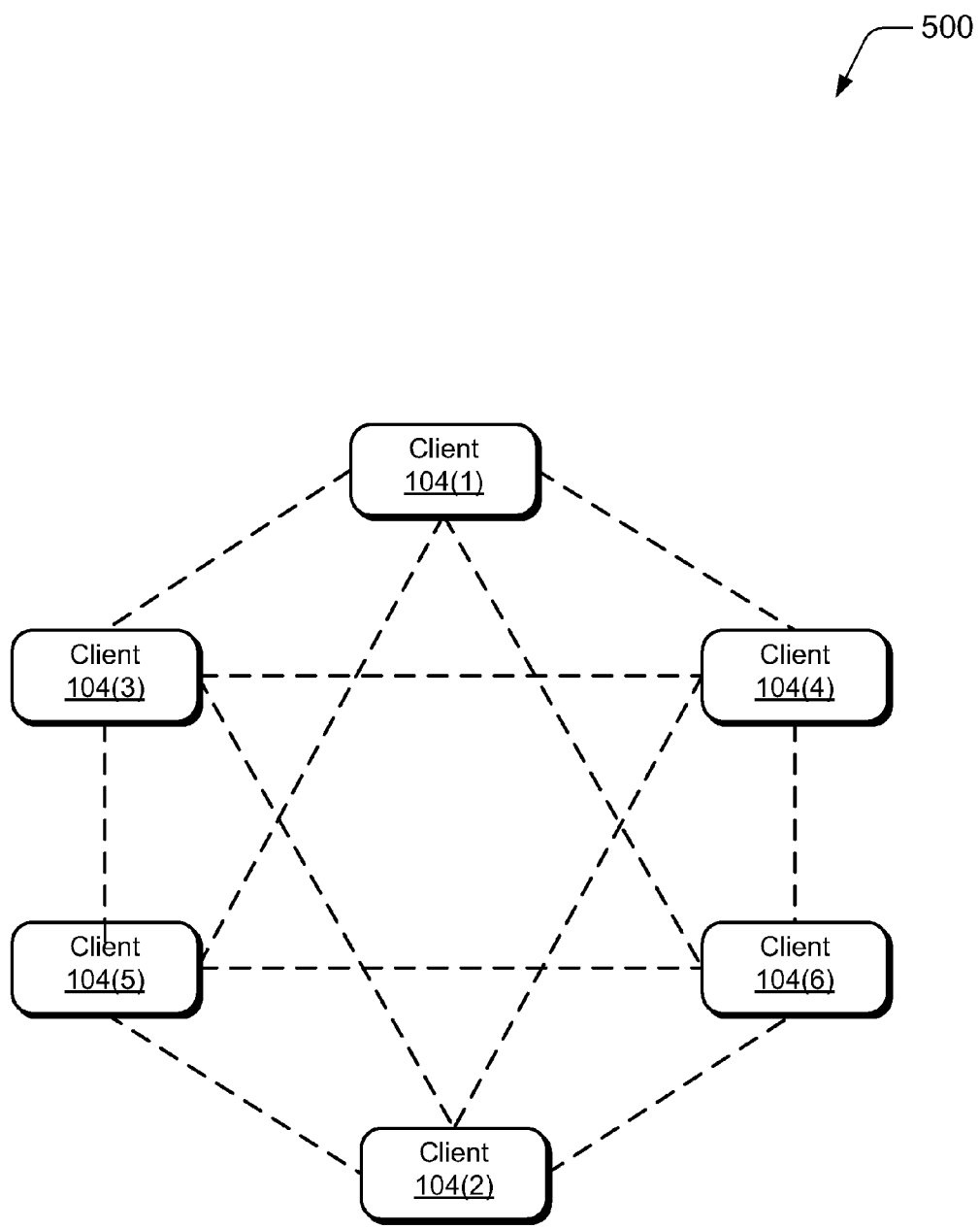
FIG. 5 is an illustration depicting a client graph illustrating the interconnections of clients of a cluster of clients within the example social networking service of FIG. 4.

FIG. 5 illustrates an example cluster of clients 500 selected from among the clients 104(1)-104(n) of the social networking service 400 of FIG. 4. In the embodiment illustrated, the cluster of clients 500 includes clients 104(1)-104(6) which share multiple connections with the other clients of the cluster 500. Clients 104(1)-104(9) of the social networking service 400 of FIG. 4 that have connections to the cluster of clients 500 (e.g., clients 104(2)-104(6) but which are not connected to the client 104(1) may then be ranked as discussed in the description of process 300 of FIG. 3 to determine those clients that may be suggested as friends to the client 104(1). For example, in FIG. 5, client 104(2) may be ranked as a good friend suggestion for client 104(1) since client 104(2) is also a member of the cluster 500, shares connections (e.g., as common friends) with clients 104(3)-104(6) that are friends of the client 104(1), but is not connected to the client 104(1).

Figure 6:
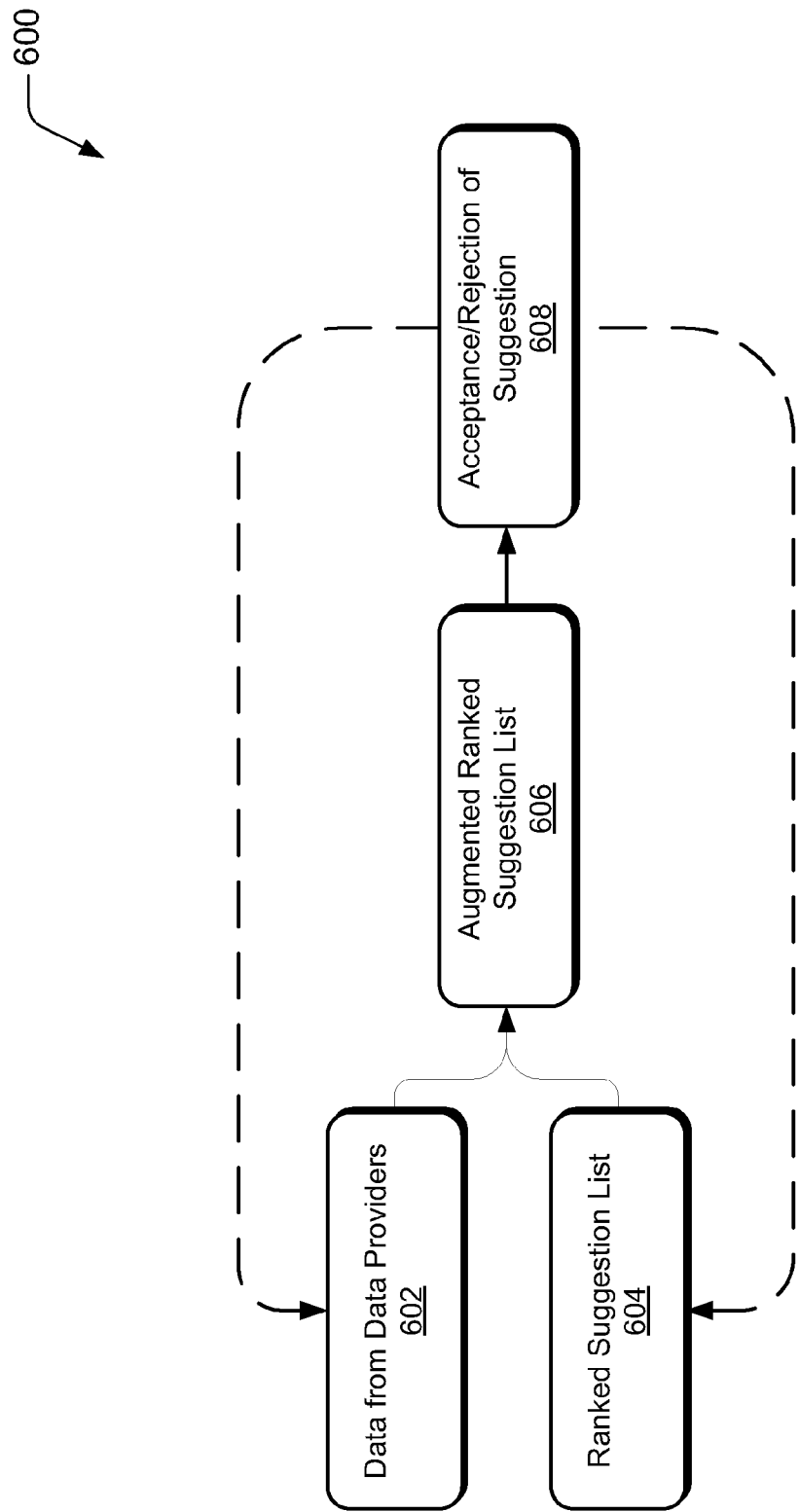
FIG. 6 is an illustration depicting a procedure in an example implementation in which data from data providers is aggregated to generate a list of suggested friends and acceptance/rejection data is used in a feedback loop to rank the data providers.

FIG. 6 illustrates a procedure 600 in an example implementation in which data from data providers is aggregated to generate a list of suggested friends for a client. In implementations, aggregate client interaction data 602 may be received from one or more data providers. The aggregate client interaction data 602 may describe interactions of the client for which a friend suggestion is to be made with other clients of the social networking service. As discussed in relation to FIG. 2, a variety of data may be provided from various data providers. For example, aggregate client interaction data 604 may include friend suggestions made by the data providers. Aggregate client interaction data 604 may also include information that may be used to generate weighting factors to rank the friend suggestions. Still further, aggregate client interaction data 604 may describe interactions client device 204 such as the sharing of a photograph with another client of the social networking service, the posting of comments in a blog site visited by another client of the social networking service, and so forth. This information may be used to generate additional friend suggestions, weight existing friend suggestions, and so forth.

As illustrated, the ranked suggestion list 604 may be augmented based on the aggregate client interaction data 602 to generate an augmented ranked suggestion list 606. In implementations, the aggregate client interaction data 602 may include friend suggestions made by data providers such as other clients, other network services and so forth. The friend suggestions may be ranked and added the ranked suggestion list 604 to generate the augmented ranked suggestion list 606.

Friend suggestions may be ranked using a variety of criteria. In implementations, friend suggestions may be weighted by applying one or more weighting factors. For instance, in some embodiments, data providers that make friend suggestions may be assigned weighting factors that may be used to rank the friend suggestions made by the data provider. The weighting factors may comprise scores that indicate the relative quality of friend suggestions made by the data provider in comparison with other data providers. Friend suggestions in the ranked suggestion list 604 made based on connections of clients with the cluster of clients may also be ranked by application of a weighting factor in this manner. Other weighting factors may also be used. For instance, in implementations, friend suggestions made by multiple sources may be weighted. For example, if a data provider makes friend suggestion that that already contained within the list of suggested friends, the weight given to the friend suggestion may be adjusted (e.g., increased or decreased) to indicate that the friend suggestion has been made by multiple sources.

In implementations, the weighting factors applied to friend suggestions may be adjusted over time based on past friend suggestions. For example, the weighting factor assigned to a data provider may be adjusted based on the historical ratio of acceptances to rejections 608 of friend suggestions made by the data provider. Thus, in one embodiment, when friend suggestions from a data provider are consistently accepted the weight given to that data provider may be increased. Conversely, when friend suggestions from a data provider are consistently rejected the weight given to that data provider may be decreased. In this manner, the relative weight given to data received from each data provider may be adjusted over time based on the past performance of suggestions made using data received from that data provider. In implementations, similar weighting factors may be applied to the ranked suggestion list 604. This weighting factor may likewise be revised over time using acceptance/rejection data in a feedback loop.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A computer implemented method comprising:
   identifying a cluster of clients selected from a plurality of clients of a social networking service, the cluster of clients including a first client;
   ranking one or more of the plurality of clients based on connections of the one or more clients with the cluster of clients to generate a ranked suggestion list of the one or more clients;
   augmenting the ranked suggestion list with a friend suggestion made by a data provider; and
   generating a list of suggested friends for the first client, the list of suggested friends including the one or more clients that are selected based on the connections of the one or more clients with the cluster of clients.

2. A method as recited in claim 1, wherein the list of suggested friends is based on the ranked suggestion list.

3. A method as recited in claim 1, wherein the augmenting of the ranked suggestion list comprises ranking the friend suggestion.

4. A method as recited in claim 3, wherein the ranking of the one or more friend suggestions comprises applying a weighting factor to the friend suggestion, the weighting factor being adjusted based on past acceptance or rejection of friends suggested to the first client by the data provider.

5. A method as recited in claim 1, wherein the identifying of the cluster of clients comprises selecting clients of the plurality of clients to be in the cluster of clients based on whether the clients have connections, one to another.

6. A method as recited in claim 1, wherein the selecting of the clients continues until the cluster of clients includes a predetermined number of clients.

7. One or more computer-readable storage media comprising instructions that are executable to implement a social networking service that is configured to generate a list of suggested friends for a first client of the social networking service based on connections of one or more additional clients with a cluster of clients, the one or more additional clients being ranked based on the connections of the one or more additional clients with the cluster of clients to generate a ranked suggestion list, the ranked suggested list being augmented with aggregate data comprising friend suggestions and information describing the first client's interactions received from one or more data providers.

8. One or more computer readable storage media as recited in claim 7, wherein the list of suggested friends is based on the ranked suggestion list.

9. One or more computer readable storage media as recited in claim 8, wherein the one or more friend suggestions are weighted with at least one weighting factor.

10. One or more computer readable storage media as recited in claim 9, wherein the at least one weighting factor is adjusted based on past acceptance or rejection of friends suggested to the first client by the one or more data providers.

11. One or more computer readable storage media as recited in claim 7, wherein the cluster of clients is identified by selecting clients of the plurality of clients to be in the cluster of clients based on whether the clients have connections to the cluster of clients.

12. One or more computer readable storage media as recited in claim 7, wherein clients of the plurality of clients are selected to be in the cluster of clients until the cluster of clients includes a predetermined number of clients.

13. A system comprising:
   one or more processors;
   one or more computer-readable storage media; and
   one or more modules having instructions on the one or more computer-readable storage media that are executable by the one or more processors to:
      select a cluster of clients from a plurality of clients of a social networking service, the cluster of clients including a first client;
      rank one or more said clients of the plurality of clients based on connections of the one or more said clients with the cluster to create a ranking of the one or more said clients, the ranking of the one or more said clients being augmented with one or more friend suggestions made by another networking service; and
      generate a list of suggested friends for the first client based on the ranking of the one or more said clients, the list indicating at least one of the one or more said clients that is suggested as a friend to the first client.

14. A system as recited in claim 13, wherein the one or more friend suggestions are weighted with at least one weighting factor.

15. A system as recited in claim 14, wherein the at least one weighting factor is adjusted based on past acceptance or rejection of friends suggested to the first client by the one or more data providers.

16. A system as recited in claim 13, wherein the cluster is identified by selecting clients of the plurality of clients to be in the cluster, the selected clients having connections to the cluster.

17. A system as recited in claim 13, wherein clients of the plurality of clients are selected to be in the cluster until the cluster includes a predetermined number of said clients.

* * * * *